United States Patent
Kasono (10) Patent No.: US 6,226,238 B1
(45) Date of Patent: May 1, 2001

(54) OPTICAL DISC MASTER RECORDING DEVICE

(75) Inventor: Osamu Kasono, Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/280,563

(22) Filed: Mar. 30, 1999

(30) Foreign Application Priority Data

Mar. 31, 1998 (JP) .................................................. 10-104010

(51) Int. Cl.[7] ......................................................... G11B 7/12
(52) U.S. Cl. ..................................... 369/44.23; 369/44.25; 369/112
(58) Field of Search ............................... 369/44.11, 44.12, 369/44.14, 44.23, 44.25, 44.27, 44.28, 112, 109

(56) References Cited

U.S. PATENT DOCUMENTS 5,729,393 * 3/1998 Lee et al. ...................... 369/44.15 X
6,157,598 * 12/2000 Mowry et al. .................... 369/44.23

* cited by examiner

Primary Examiner—Muhammad Edun
(74) Attorney, Agent, or Firm—Arent Fox Kintner Plotkin & Kahn, PLLC (57) ABSTRACT

An optical disc master recording device can surely control an optical spot position even if an objective lens and SIL are attached to an optical head, and includes an objective lens for gathering a recording light irradiating an optical disc master, a solid immersion lens for further converging the recording light gathered by the objective lens, first drive element driving the objective lens to the radial direction of the optical disc master, second drive element driving the solid immersion lens to the radial direction of the optical disc master, unit for determining a center position of the objective lens from a reference position in the radial direction, unit for determining a center position of the solid immersion lens from a reference position in the radial direction, circuit for calculating a spot position of the recording light on the optical disc master according to the center positions of the objective lens and the solid immersion lens, and control element for controlling the first and second drive element so as to approach the calculated spot position to the target spot position.

6 Claims, 6 Drawing Sheets

OPTICAL DISC MASTER RECORDING DEVICE

BACKGROUND OF THE INVENTION

The present invention relates generally to an optical disc master recording device which is used to make an optical disc master.

As is conventional, various optical disc master recording devices have been used for creating an optical disc master of a compact disc, laser disc, or the like. These commonly known optical disc master recording devices have been constituted such that information is helically recorded on an optical disc master composed of a glass plate having an abraded surface on which a photoresist layer is formed. This recording operation is performed by rotation controlling the optical disc master so as to rotate at a predetermined rotational speed and by sequential feed controlling laser light gathered with an objective lens in an optical head in the radial direction of the optical disc master.

Coarse and fine adjustments are performed so that a spot position of the laser light is caused to agree with a target spot position. The coarse adjustment is performed by causing the entire optical head to drive in the radial direction of the optical disc master and the fine adjustment is performed by causing the objective lens to drive in the radial direction with an actuator in the optical head. In this case, a center position of the objective lens is made the spot position of the laser light, so that the coarse and fine adjustments described above are performed by detecting the center position of the objective lens and then by causing the optical head and actuator to drive so as to eliminate the amount of space between the center position of the objective lens and the target spot position.

Over the years, in order to significantly improve a recording density of the optical disc, information has to be recorded with extremely small track pitch and bit as compared with conventional techniques. However, there is a limit to form a significantly small light spot only with the objective lens as compared with a current light spot.

Incidentally, a method using a solid immersion lens (hereinafter referred to as SIL) is known as a method for further converging the laser light gathered by an objective lens.

Figure 1:
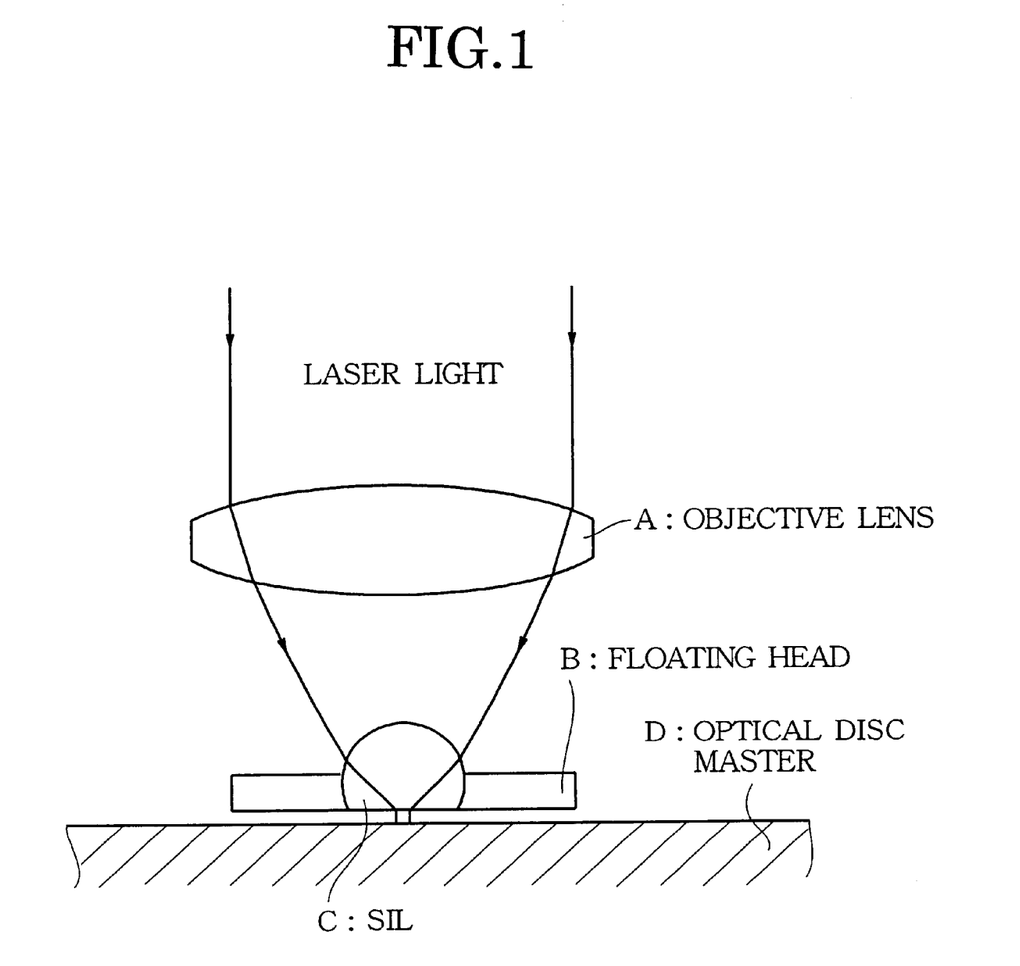
FIG. 1 is a schematic diagram showing a basic configuration of a conventional optical head of an optical disc master recording device in which a laser light is further converged by an SIL after being gathered by an objective lens.

FIG. 1 in accompanying drawings illustrates the condition in which a laser light gathered by an objective lens is further converged by an SIL. The laser light from a light source (not shown) is converged by the objective lens A to be incident on the SIL C which is held in a floating head B. The incident laser light is further converged by the SIL C and exposed on an optical disc master D. Incidentally, the objective lens A and SIL C are configured such that they can be driven independently. The number of aperture of the objective lens A can be substantially increased by the SIL C, resulting in the formation of a minute light spot on the optical disc master.

Since two kinds of lenses are provided in an optical disc master recording device having an optical head with the objective lens and SIL shown in FIG. 1, the center position of the objective lens or SIL does not correspond to the spot position of the laser light, respectively. In other words, the positional relationship between the objective lens and SIL causes the position of the light spot to change. Therefore, the position of the light spot on an optical disc master can not be determined only by detecting the center position of the objective lens, as with the devices having been proposed in the prior art. Accordingly, there was a problem in which the current position of the light spot can not be controlled to approach the target spot position in the conventional method.

SUMMARY OF THE INVENTION

The present invention has been made in view of the above-described background, and therefore, has an object to provide an optical disc master recording device which can ensure to control a position of a light spot even if both an objective lens and SIL are attached to an optical head thereof.

In order to achieve the object described above, according to one aspect of the present invention, an optical disc master recording device is provided which comprises an objective lens for gathering a recording light irradiating an optical disc master, a solid immersion lens for further converging the recording light gathered by the objective lens, first drive means for driving the objective lens to a radial direction of the optical disc master, second drive means for driving the solid immersion lens to the radial direction of the optical disc master, means for determining a center position of the objective lens from a reference position in the radial direction, means for determining a center position of the solid immersion lens from the reference position in the radial direction, means for calculating a spot position of the recording light on the optical disc master according to the center positions of the objective lens and the solid immersion lens, and control means for controlling the first and second drive means so as to approach the calculated spot position to a target spot position.

According to another aspect of the present invention, an optical disc master recording device is provided which comprises an objective lens for gathering a recording light irradiating an optical disc master, a solid immersion lens for further converging the recording light gathered by the objective lens, first drive means for driving the objective lens to a radial direction of the optical disc master, second drive means for driving the solid immersion lens to the radial direction of the optical disc master, means for determining a center position of the solid immersion lens from a reference position in the radial direction, means for detecting amount of space of the center position of the objective lens with respect to the center position of the solid immersion lens, means for calculating a spot position of the recording light on the optical disc master according to the amount of space and the center position of the solid immersion lens, and control means for controlling the first and second drive means so as to approach the calculated spot position to a target spot position.

The control means is preferably configured such that the difference between the calculated spot position and the target spot position is formed as a tracking error signal and the first and second drive means are controlled in accordance with the tracking error signal.

In addition, the control means is configured to control the second drive means in accordance with low frequency components of the tracking error signal.

In the optical disc master recording device according to the present invention, even if the objective lens and the solid immersion lens deviate from the respective target spot positions during recording, the control means may control the first and second drive means so as to adjust the spot positions calculated in accordance with the center positions of the objective lens and solid immersion lens to the target spot positions, so that it is ensured that the light spot position on the optical disc master can be adjusted to the target spot position.

BRIEF DESCRIPTION OF THE DRAWINGS

The above and other objects, features and advantages of the present invention will be more apparent from the following detailed description taken in conjunction with the accompanying drawings in which.

DETAILED DESCRIPTION OF THE PREFERRED EMBODIMENTS

The preferred embodiments according to the present invention will hereinbelow be described in detail only as examples with reference to FIGS. 2 to 6 in the accompanying drawings.

Figure 2:
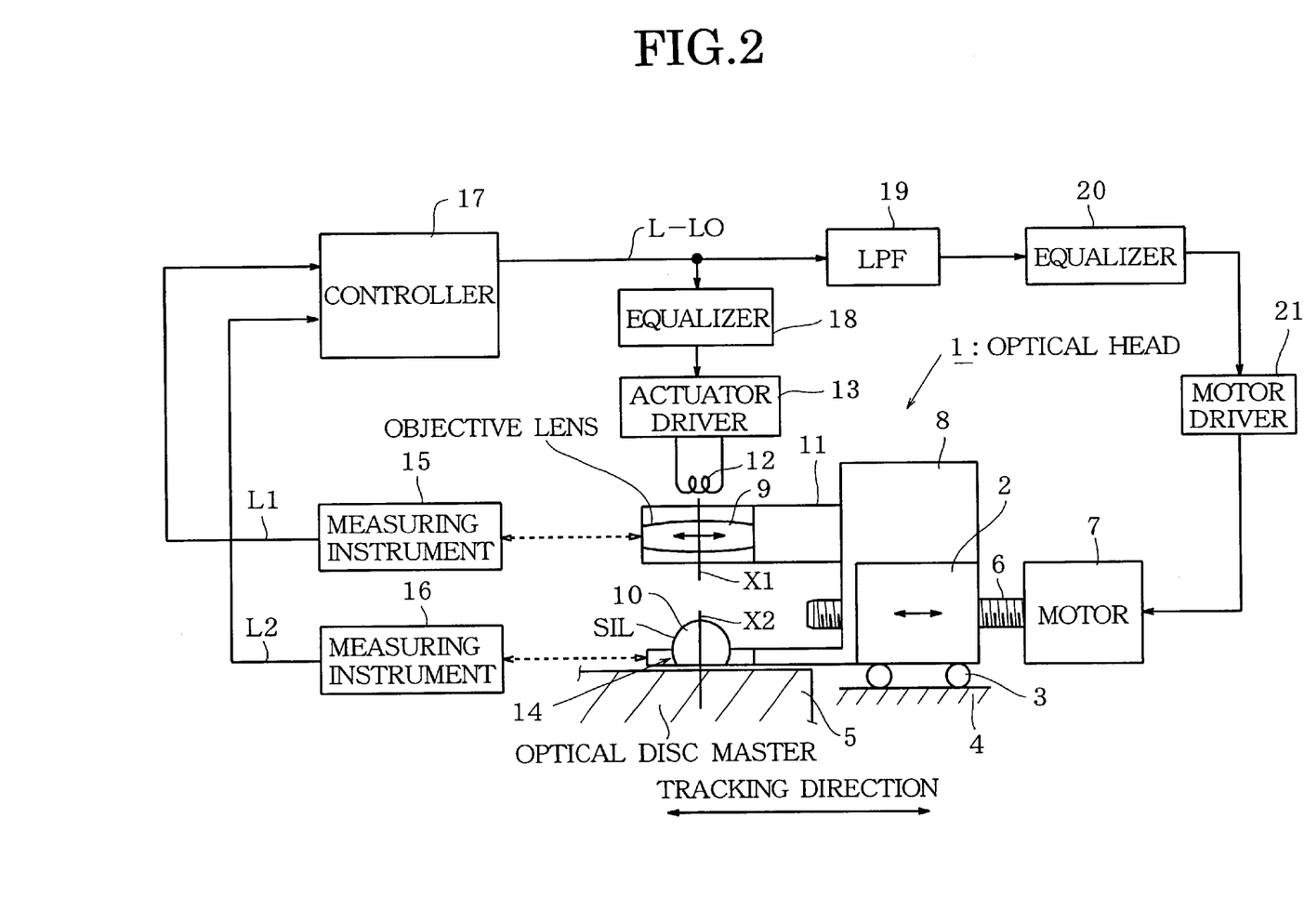
FIG. 2 is a block diagram showing the control of the optical head of the optical disc master recording device in accordance with the first embodiment of the present invention.

Referring to FIG. 2, there is shown a control system of an optical head of an optical disc master recording device in block diagram form according to the first embodiment of the present invention.

In FIG. 2, an optical head 1 is provided with a carriage 2 which is disposed on a pedestal 4 of the optical disc master recording device through roller guides 3, and is constituted so as to be driven movably in the radial direction of an optical disc master 5 by an engaging feed screw 6 and a motor 7 which rotates the feed screw 6. The carriage 2 also carries an enclosure 8. The optical head 1 is also provided with an objective lens 9 and an SIL 10. The objective lens 9 is attached to the enclosure 8 through a support member 11 composed of an elastic material and is held in floatable state movably in the tracking and focusing directions by an actuator 12. The actuator 12 is a drive coil for driving the objective lens 9 in the tracking and focusing directions, and can transfer an optical axis X1 of the objective lens 9 in the tracking direction as desired according to a driving current supplied by an actuator driver 13.

In addition, a floating head 14 is attached to the enclosure 8, and this floating head 14 holds the SIL 10 so that the distance between the optical disc master 5 and the SIL 10 is kept to be 50 to 100 nm during recording operation is performed. Incidentally, a negative pressure head is preferably used as the floating head 14, allowing the distance between the optical disc master 5 and the SIL 10 to keep constant regardless of the line speed of the disc master 5. Substantial detail regarding the negative pressure head is contained in Nikkei Electronics, No. 528, issued May 27, 1991, page 110–111, the disclosure of which is hereby incorporated by reference. An optical axis X2 of the SIL 10 can be transferred in the tracking direction by driving the motor 7 to properly move the floating head 14 as well as the enclosure 8 in the tracking direction.

Blocks 15, 16 are optical measuring instruments for measuring positions of the objective lens 9 and the SIL 10, respectively. That is, the measuring instrument 15 measures optically the position of the objective lens 9 with respect to the reference position in the radial direction of the optical disc master 5, and produces a signal indicating the center position L1 of the objective lens 9 to output it to a controller 17. The measuring instrument 16 measures optically the position of the SIL 10 with respect to the reference position in the radial direction of the optical disc master 5, and produces a signal indicating the center position L2 of the SIL 10 to output it to the controller 17.

The methods described in Japanese Patent Application Laid Open No. Hei 3(1991)-150746 can be used as a method for optically determining the positions of the objective lens 9 and SIL 10, the disclosure of which is hereby incorporated by reference.

The controller 17 calculates a spot position L of a laser light on the optical disc master based on the signals indicating the center position L1 of the objective lens 9 and the center position L2 of the SIL 10. Further, the controller 17 outputs a tracking error signal (L–LO) indicating an amount of space between the calculated spot position L and the target spot position LO. Incidentally, the concrete configuration of the controller 17 will be described hereinafter in detail.

The tracking error signal created in the controller 17 is supplied to a low-pass filter (LPF) 19. Low frequency components of the tracking error signal passed through the LPF 19 are supplied to an equalizer 20, in which these low frequency components are waveform-shaped to be supplied to a motor driver 21. In the motor driver 21, a drive signal for driving the motor 7 is created based on the tracking error signal supplied. The motor 7 is activated according to this drive signal, thereby rotating the feed screw 6, then the SIL 10 mounted on the floating head 14 which is attached to the enclosure 8 is moved toward the tracking direction, so that tracking adjustment of the optical axis X2 of the SIL 10 may be performed.

Additionally, the tracking error signal created in the controller 17 is also supplied to an equalizer 18. The tracking error signal which is waveform-shaped in the equalizer 18 is supplied to the actuator driver 13. Then, a drive signal outputted from the actuator driver 13 is supplied to the actuator 12, thereby moving the objective lens 9 in the tracking direction to perform the tracking adjustment of the optical axis X1 of the objective lens 9. In this case, the controller 17 causes the SIL 10 to move in the tracking direction so as to approach the calculated spot position L to the target spot position LO based on the low frequency components of the tracking error signal. This is because the mass of the carriage 2 for moving the SIL 10 is too large to respond to high frequency components of the tracking error signal.

As previously explained, the optical disc master recording device according to the first embodiment is controlled such that the controller 17 produces the tracking error signal (L–LO) based on the calculated spot position L and the target spot position LO, the optical axis X1 of the objective lens 9 and the optical axis X2 of the SIL are independently moved in the tracking direction based on the tracking error signal, and the tracking error signal (L–LO) is caused to be zero, that is, the calculated spot position L is caused to move to the target spot position LO. Accordingly, the spot position of the laser light can be controlled accurately.

Figure 3:
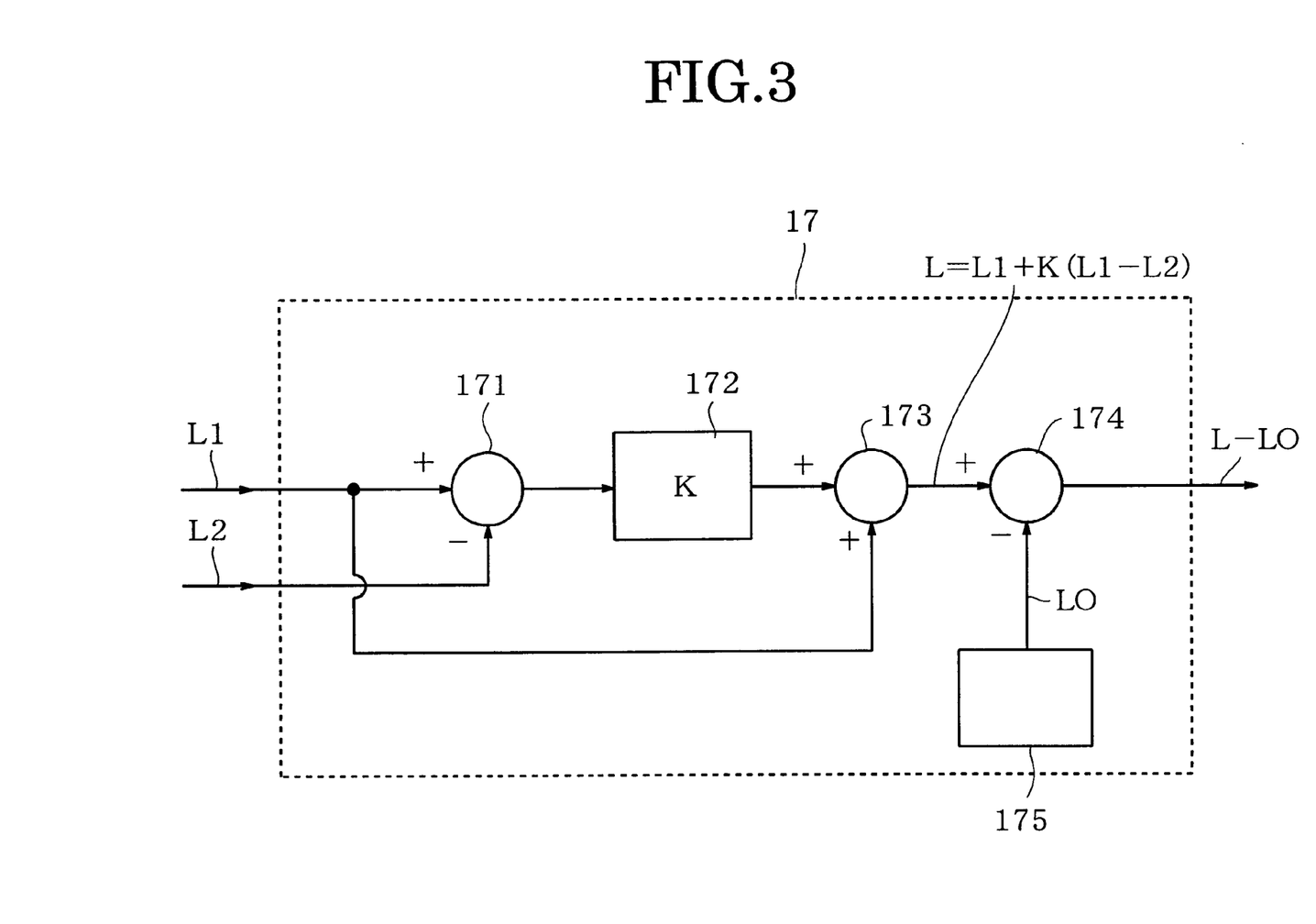
FIG. 3 is a block diagram showing the configuration of a controller in the optical disc master recording device in accordance with the first embodiment shown in FIG. 2.

FIG. 3 shows the configuration of the controller 17. The controller 17 is provided with a subtracter 171 which performs a subtraction function between the output L1 of the measuring instrument 15 and the output L2 of the measuring instrument 16, a gain adjuster 172, an adder 173, a subtracter 174, and a target spot position signal generation means 175 which outputs a signal indicating the target spot position.

Next, the concrete control operation of the controller thus constituted will be explained hereinafter.

In FIG. 3, the signal designating the center position L1 of the objective lens 9 detected by the measuring instrument 15 is supplied to the subtracter 171 and adder 173. The signal designating the center position L2 of the SIL 10 detected by the measuring instrument 16 is supplied to the subtracter 171.

The subtracter 171 subtracts L2 from L1 and outputs a difference signal (L1-L2) to the gain adjuster 172. The gain adjuster 172 multiplies this difference signal by K to output the result to the adder 173. In this case, K is a constant (0<K<1) appropriately set in accordance with optical properties of the objective lens 9 and SIL 10 used in the optical head 1. For example, assuming n is an index of refraction of the SIL 10, the constant K can be set like K=1-1/n, K=1-1/n2, or the like.

Figure 4:
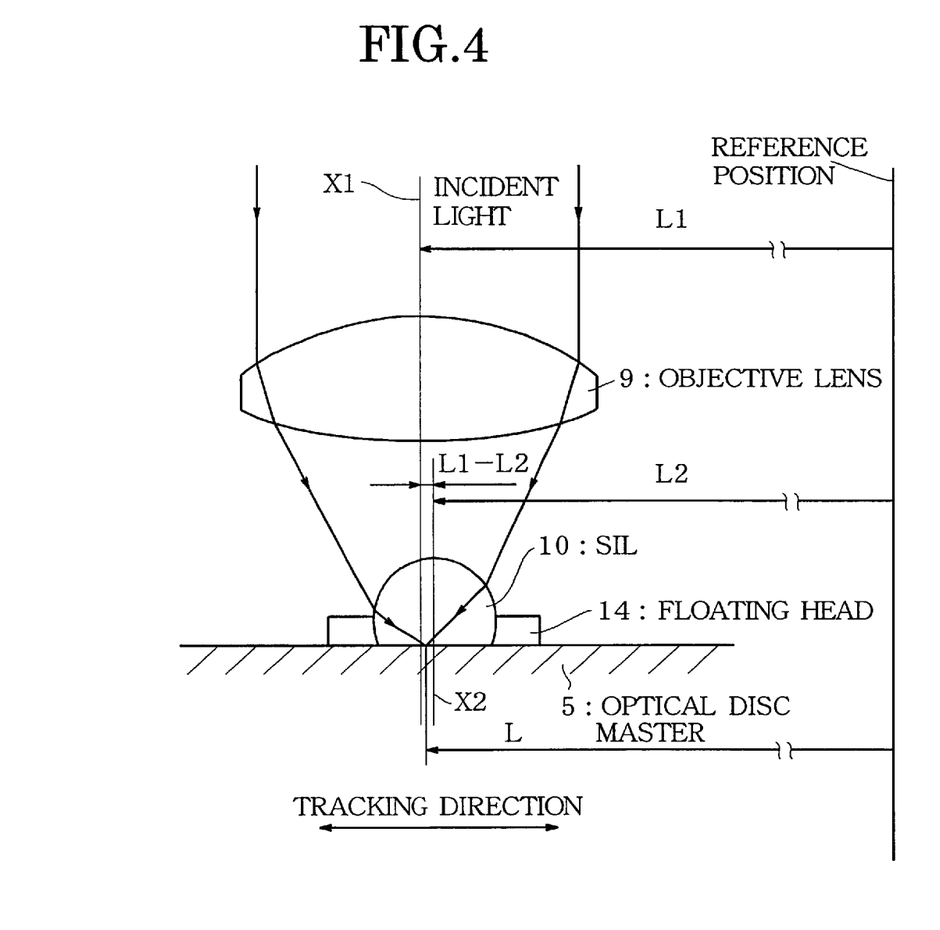
FIG. 4 is a schematic diagram showing the positional relation with respect to one another between an optical axis X1 of the objective lens and an optical axis X2 of the SIL.

FIG. 4 shows the positional relationship between the optical axis X1 of the objective lens 9 and the optical axis X2 of the SIL 10. As shown in FIG. 4, L1 is the distance from the reference position to the optical axis X1 of the objective lens 9 in the tracking direction, and L2 is the distance from the reference position to the optical axis X2 of the SIL 10 in the tracking direction. Therefore, the optical axis X2 of the SIL 10 is displaced by (L1-L2) with respect to the optical axis X1 of the objective lens 9.

In this case, the spot position L on the optical disc master 5 of the laser light converged by the objective lens 9 and SIL 10 is expressed, using above described constant K, by the following equation:

$$L=L1+K(L1-L2)$$

In the controller 17, in order to determine the optical spot position L, the signal K(L1-L2) is formed in the gain adjuster 172 using L1 detected in the measuring instrument 15 and L2 detected in the measuring instrument 16 to be supplied to the adder 173. The adder 173 adds the signal K(L1-L2) to the signal L1 from the measuring instrument 15. The output from the adder 173 is supplied to the subtracter 174 in order to form the tracking error signal. That is, the output of the adder 173 and the signal, which is an output from the target spot position signal generation means 175, designating the target spot position LO are supplied to an input of the subtracter 174. The target spot position LO in the target spot position signal generation means 175 is sequentially updated as the recording operation goes forward. The subtracter 174 creates the tracking error signal (L-LO) by subtracting the target spot position LO from the spot position L which is the output signal of the adder 173 to supply it to the equalizer 18 and LPF 19. Thus, the objective lens 9 and SIL 10 are caused to move in the tracking direction based on the tracking error signal outputted from the controller 17, thereby allowing the spot position of the laser light to be controlled so as to cause the spot position of the laser light to be the target spot position.

Figure 5:
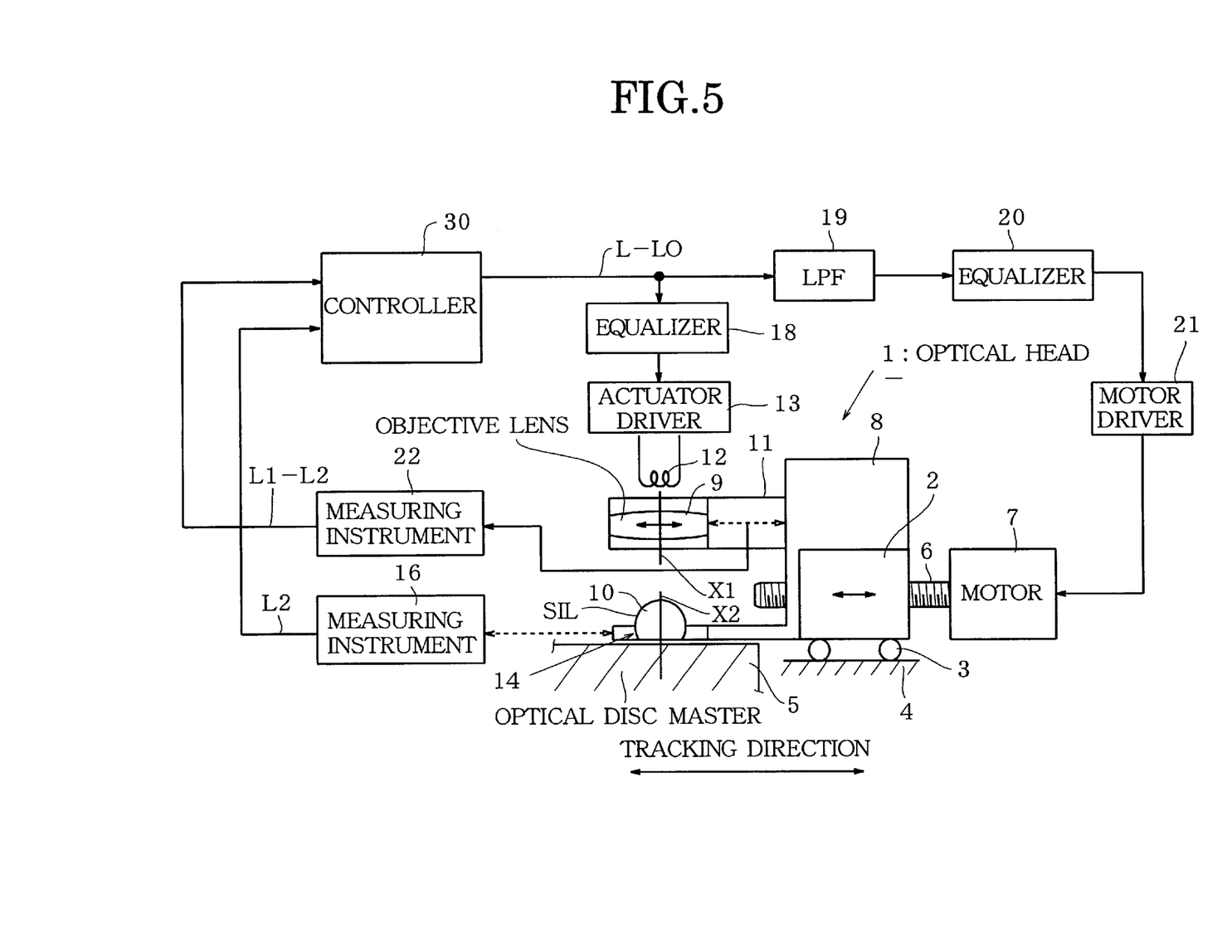
FIG. 5 is a block diagram showing the control of the optical head of the optical disc master recording device in accordance with the second embodiment of the present invention.

Next, the second embodiment according to the present invention will be described by way of reference to FIGS. 5 and 6. In FIG. 5, identical components to those in the first embodiment are identified by the same reference character as FIG. 2 and their detailed explanation will be omitted.

In the second embodiment, the device is constituted such that a measuring instrument 22 which detects amount of space of the center position L1 of the objective lens 9 with respect to the center position L2 of the SIL 10, that is, L1-L2, is provided instead of the measuring instrument 15 which determines the center position L1 of the objective lens 9 in the first embodiment shown in FIG. 2, and the tracking error signal (L-LO) is formed based on an output of this measuring instrument 22 and the output L2 of the measuring instrument 16.

In FIG. 5, the measuring instrument 22 optically detects an amount of space, that is, L1-L2, of the center position L1 of the objective lens 9 with respect to the center position L2 of the SIL 10. More specifically, the measuring instrument 22 is constituted to detect the amount of displacement of the objective lens 9 using a Piezo element or the like and to determine L1-L2 as the amount of space according to this amount of displacement. The output signal of the measuring instrument 22 designating this amount of space is then supplied to a controller 30. On the other hand, the measuring instrument 16 optically detects the position of the SIL 10 from the reference position in the radial direction of the optical disc master 5 to output the signal designating the center position L2 of the SIL 10 to the controller 30.

The controller 30 calculates the spot position L of the laser light on the optical disc master 5 based on L1-L2 outputted from the measuring instrument 22 and L2 outputted from the measuring instrument 16 to produce the tracking error signal (L-LO) designating the amount of space between this calculated spot position L and the target spot position LO. The tracking error signal produced in the controller 30 is supplied to the equalizer 18 and LPF 19, and subsequent operation of the controller 30 is performed in the same manner as that in the first embodiment described above. That is, the control operation is performed so as to move the calculated spot position L to the target spot position LO, thereby enabling the spot position of the laser light to be controlled accurately.

Figure 6:
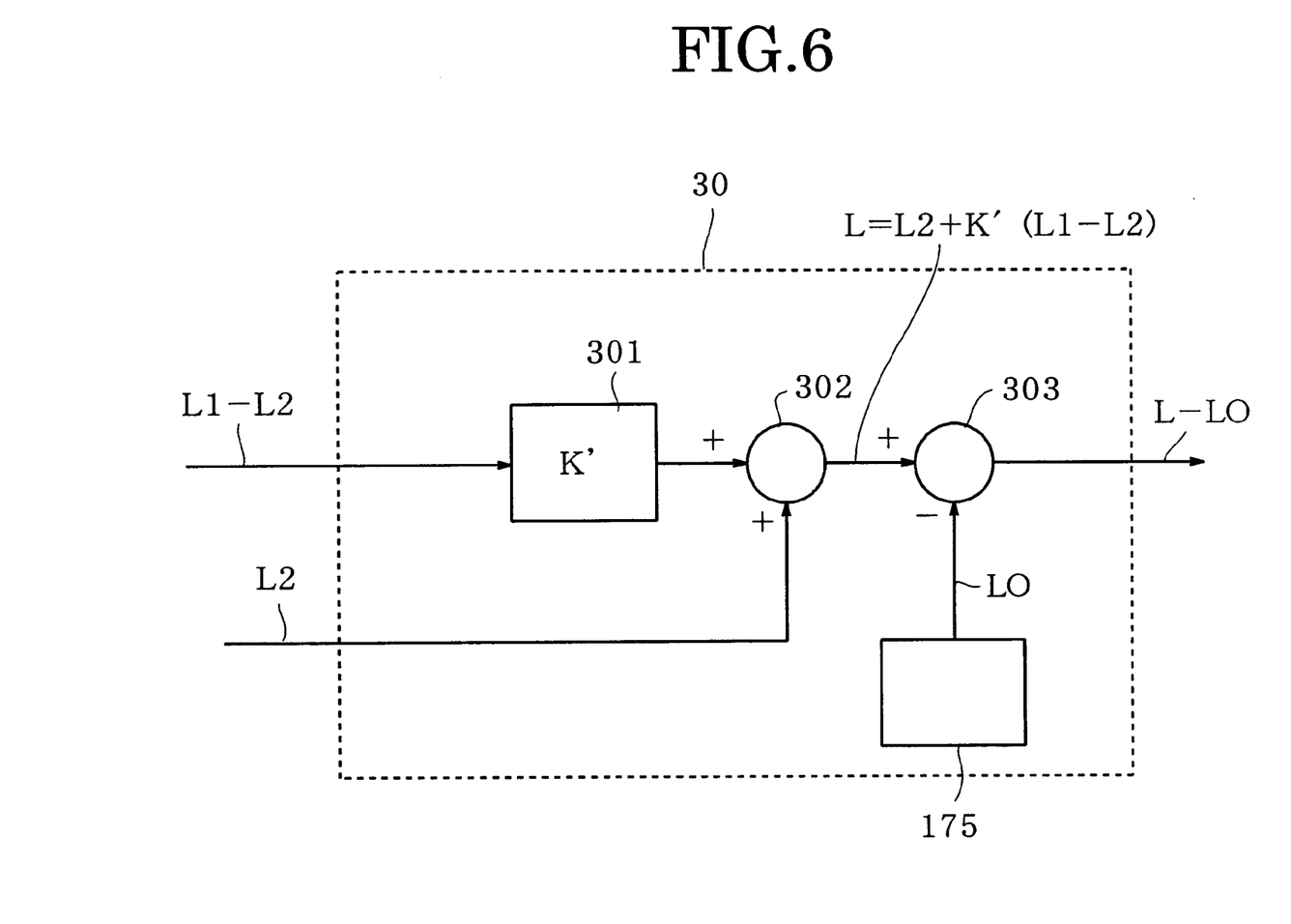
FIG. 6 is a block diagram showing the configuration of a controller in the optical disc master recording device shown in FIG. 5.

FIG. 6 shows the configuration of the controller 30. The controller 30 is provided with a gain adjuster 301 to which the output (L1-L2) of the measuring instrument 22 is supplied, an adder 302 which adds the output of the gain adjuster 301 and the output L2 of the measuring instrument 16, a subtracter 303, and the target spot position signal generation means 175.

Next, the concrete control operation of the controller 30 will be described below.

In FIG. 6, the output (L1-L2) determined in the measuring instrument 22 is supplied to the gain adjuster 301. The gain adjuster 301 multiplies this supplied signal by K' to form K'(L1-L2) and to supply it to the adder 302. Here, K' is, as with K described above, a constant (0<K'<1) appropriately set in accordance with optical properties of the objective lens 9 and SIL 10 used in the optical head 1.

In FIG. 4, the spot position L of the laser light on the optical disc master 5 converged by the objective lens 9 and SIL 10 deviates in the opposite direction to the deviated direction of the objective lens 9 relative to the optical axis X2 of the SIL 10 and the amount of space from the optical axis X2 is substantially proportional to that of X1 relative to the optical axis X2. Accordingly, assuming this proportionality factor to be K' to calculate the present spot position L, the following equation can be given:

$$L=L2+K'(L1-L2)$$

Thus, as described above, the gain adjuster 301 produces K'(L1−L2) to output it to the adder 302, which calculates the current spot position L (L=L2+K'(L1−L2)) on the optical disc master 5 of the recording light, that is, the current amount of space from the reference position described above of the recording light converged by the objective lens 9 and the SIL 10 by adding this K'(L1−L2) and L2 from the measuring instrument 16.

The output of the adder 302 is supplied to the subtracter 303 to form a tracking error signal. The output of the adder 302 and the target spot position LO which is the output from the target spot position signal generation means 175 are supplied to the subtracter 303. The subtracter 303 produces the tracking error signal (L−LO) by subtracting the target spot position LO from the spot position L calculated by the adder 302. Such a tracking error signal is supplied to the equalizer 18 and LPF 19.

The objective lens 9 and SIL 10 are caused to move in the tracking direction based on the tracking error signal outputted from the controller 30, thereby allowing the spot position of the laser light to be controlled so as to cause the spot position of the laser light to be the target spot position. Incidentally, while it has been described that the objective lens 9 is used for fine adjustment of the tracking and the SIL 10 is used for coarse adjustment of the tracking due to low frequency components of the tracking error signal in each embodiment described above, the present invention is not limited to those embodiments, and so it may be constituted such that the objective lens 9 is used for coarse adjustment of the tracking and the SIL 10 is used for fine adjustment of the tracking.

As previously explained, in accordance with the present invention, even if each of an objective lens and solid immersion lens deviates from the target spot positions LO during recording operation, control means controls first and second drive means so as to adjust the spot position L calculated according to the center position L1 of the objective lens and the center position L2 of the solid immersion lens to the target spot position LO, so that a recording light which is gathered by the objective lens and is further converged by the solid immersion lens is made it possible to accurately follow the target spot position LO on an optical disc master to form an optical spot.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An optical disc master recording device, comprising:

an objective lens for gathering a recording light irradiating an optical disc master;

a solid immersion lens for further converging the recording light gathered by said objective lens;

first drive means for driving said objective lens to a radial direction of said optical disc master;

second drive means for driving said solid immersion lens to the radial direction of said optical disc master;

means for determining a center position of said objective lens from a reference position in said radial direction;

means for determining a center position of said solid immersion lens from the reference position in said radial direction;

means for calculating a spot position of said recording light on said optical disc master according to the center positions of said objective lens and said solid immersion lens; and control means for controlling said first and second drive means so as to approach the calculated spot position to a target spot position.

2. The optical disc master recording device according to claim 1, wherein said control means forms a difference between said calculated spot position and said target spot position as a tracking error signal to control said first and second drive means based on said tracking error signal.

3. The optical disc master recording device according to claim 2, wherein said control means controls said second drive means based on low frequency components of said tracking error signal.

4. An optical disc master recording device, comprising:

an objective lens for gathering a recording light irradiating an optical disc master;

a solid immersion lens for further converging the recording light gathered by said objective lens;

first drive means for driving said objective lens to a radial direction of said optical disc master;

second drive means for driving said solid immersion lens to the radial direction of said optical disc master;

means for determining a center position of said solid immersion lens from a reference position in said radial direction;

means for detecting amount of a space of the center position of said objective lens with respect to the center position of said solid immersion lens;

means for calculating a spot position of said recording light on said optical disc master according to said amount of space and the center position of said solid immersion lens; and control means for controlling said first and second drive means so as to approach the calculated spot position to a target spot position.

5. The optical disc master recording device according to claim 4, wherein said control means forms a difference between said calculated spot position and said target spot position as a tracking error signal to control said first and second drive means based on said tracking error signal.

6. The optical disc master recording device according to claim 5, wherein said control means controls said second drive means based on low frequency components of said tracking error signal.

* * * * *